US011506836B2

(12) United States Patent
Yamagata et al.

(10) Patent No.: US 11,506,836 B2
(45) Date of Patent: Nov. 22, 2022

(54) OPTICAL FIBER AND OPTICAL TRANSMISSION MODULE

(71) Applicant: Yazaki Corporation, Tokyo (JP)

(72) Inventors: Chiemi Yamagata, Shizuoka (JP); Takamitsu Aiba, Kanagawa (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/647,207

(22) Filed: Jan. 6, 2022

(65) Prior Publication Data

US 2022/0229226 A1 Jul. 21, 2022

(30) Foreign Application Priority Data

Jan. 15, 2021 (JP) .............................. JP2021-005168

(51) Int. Cl.
*G02B 6/036* (2006.01)
*G02B 6/028* (2006.01)
*H04B 10/50* (2013.01)

(52) U.S. Cl.
CPC ........ *G02B 6/03611* (2013.01); *G02B 6/0281* (2013.01); *H04B 10/501* (2013.01)

(58) Field of Classification Search
CPC ................................................. G02B 6/03611
See application file for complete search history.

(56) References Cited

U.S. PATENT DOCUMENTS 4,889,404 A * 12/1989 Bhagavatula ...... G02B 6/03644
398/139
2021/0075510 A1* 3/2021 Chamberlain ..... G02B 6/02042

FOREIGN PATENT DOCUMENTS

| JP | 60-221706 A | 11/1985 |
| JP | 2001-166172 A | 6/2001 |
| JP | 2010-028305 A | 2/2010 |
| JP | 2019-169780 A | 10/2019 |

* cited by examiner

*Primary Examiner* — Chris H Chu
(74) *Attorney, Agent, or Firm* — Sughrue Mion, PLLC (57) ABSTRACT

An optical fiber includes: a first core portion capable of transmitting first light; a second core portion formed on an outer periphery of the first core portion in a structure different from that of the first core portion and capable of transmitting second light different from the first light. The second core portion is formed around the outer periphery of the first core portion, and a center of the second core portion is positioned in a region of the first core portion.

8 Claims, 6 Drawing Sheets

OPTICAL FIBER AND OPTICAL TRANSMISSION MODULE

CROSS-REFERENCE TO RELATED APPLICATIONS

The present application is based on, and claims priority from Japanese Patent Application No. 2021-005168, filed on Jan. 15, 2021, the entire contents of which are incorporated herein by reference.

TECHNICAL FIELD

The present disclosure relates to an optical fiber capable of bidirectional communication formed as one optical fiber and an optical transmission module including the optical fiber.

BACKGROUND

It is known that optical paths in an optical fiber can be classified by the waveguide mode of light. For example, one or more waveguide modes appear in one optical fiber depending on parameters such as physical dimensions, refractive index, wavelength, and incident angle of the core region and the cladding region of the optical fiber. The multimode optical fiber can have multiple waveguide modes. Mode division multiplex communication method is known as one of the optical communication systems using multimode optical fiber. In this method, signals can be transmitted with being imposed on light with corresponding waveguide modes of the multiple waveguide modes.

For example, JP 2019-169780 A discloses the optical communication system realizes mode division multiplex communication using one multimode optical fiber. In this optical communication system, one multimode optical fiber carries uplink optical signals and downlink optical signals by dividing them into a low order mode group and a high order mode group whose propagation angles are greatly different.

Specifically, optical signals, which form a low order mode group, are emitted from an opening of a low-order-mode-group light source, propagate along a center axis of a multimode optical fiber through the multimode optical fiber, and enters a low-order-mode-group detector.

Further, optical signals, which form a high order mode group, are emitted from a high-order-mode-group light source, are reflected by two mirrors, converges near an end face of the multimode optical fiber, and enters the multimode optical fiber with an angle with respect to the center axis, which is larger than that of the optical signals from the low-order-mode-group light source. The incident optical signals forming the high-order mode group exit from the other end of the multi-mode optical fiber, pass a mode multi/demultiplexer, are reflected by two mirrors, and enter the high-order-mode-group detector.

SUMMARY

However, in the conventional multimode optical fiber, due to the type of refractive index distribution of the multimode optical fiber, interference may occur between the uplink optical signal and the downlink optical signal or a high-speed signal may not be properly transmitted.

The present disclosure has been made in view of the problems as described above. It is an object of the present disclosure to provide an optical fiber capable of performing high-speed communication by appropriately arranging different core portions and appropriately reducing interference between an uplink optical signal and a downlink optical signal, and an optical transmission module including the optical fiber.

An optical fiber according to an embodiment of the present disclosure preferably includes: a first core portion capable of transmitting first light; a second core portion formed on an outer periphery of the first core portion in a structure different from that of the first core portion and capable of transmitting second light different from the first light; wherein the second core portion is formed around the outer periphery of the first core portion, and a center of the second core portion is positioned in a region of the first core portion.

A optical transmission module according to another embodiment preferably includes: an optical fiber; a first light emitting element and a first light receiving element of first light propagating through the first core portion of the optical fiber; a second light emitting element and a second light receiving element of second light propagating through the second core portion of the optical fiber.

According to the present disclosure, it is possible to provide an optical fiber capable of performing high-speed communication by appropriately arranging different core portions and appropriately reducing interference between an uplink optical signal and a downlink optical signal, and an optical transmission module including the optical fiber.

DETAILED DESCRIPTION

Hereinafter, an example of an optical fiber according to the present embodiment and an optical transmission module including the optical fiber will be described in detail with reference to the drawings. It should be noted that the numerical values, shapes, materials, components, component positions, and component connections, steps, sequence of steps, and the like described in the following embodiments are examples, and these do not limit the scope of the present disclosure. Further, the ratio of the dimensions on the drawing is set only for the convenience of description, and the actual ratio may be different.

In addition, the following embodiment and its modification may include the same or similar components. In this case, the same references are given to the same or similar components, and the duplicated descriptions are omitted.

(1) Overviews of Configurations of Optical Fiber and Optical Transmission Module Including the Optical Fiber Overviews of an optical fiber 100 will be described with reference to FIGS. 1 and 2. Further, An overview of an optical transmission module will be described with reference to FIG. 3.

(1.1) Overview of Optical Fibers

Figure 1:
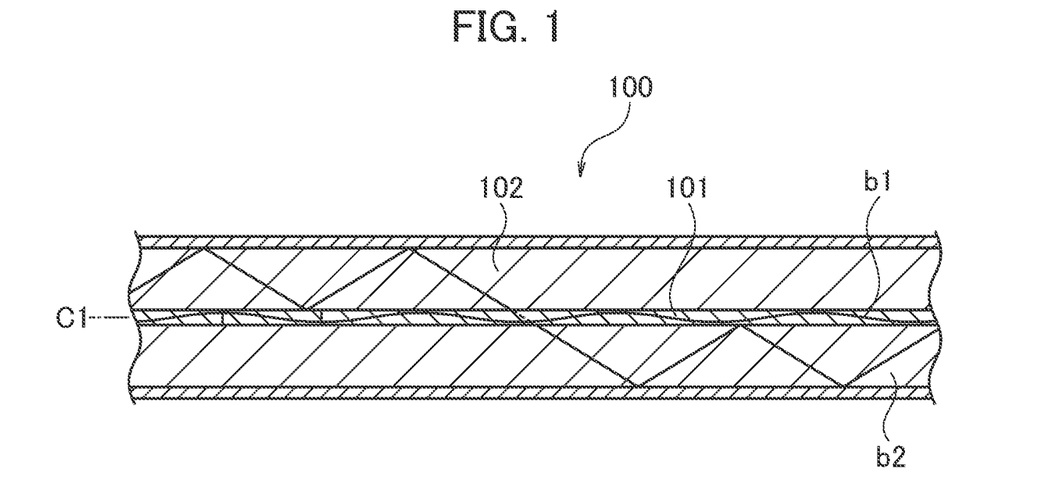
FIG. 1 is a schematic diagram illustrating an enlarged longitudinal cross-section of an optical fiber according to the present embodiment.

FIG. 1 is a schematic view illustrating an image of the optical fiber 100 according to the present embodiment. A cross-section of the optical fiber 100 preferably has a concentric double structure (two-layer structure). However, the center axes of the two-layer structure may not always coincide with each other. For example, a center of a second core portion 102 has only to be positioned in a region of a first core portion 101. The first core portion 101 having a GI structure (Graded Index fiber structure) is arranged preferably inside a concentric circle of the optical fiber 100. A second core portion 102 having a SI structure (Step Index fiber structure) is arranged outside the first core portion 101. The first core portion 101 and the second core portion 102 enable spatial separation of an uplink optical signal and a downlink optical signal in the optical fiber 100, and the optical fiber 100 becomes an optical fiber capable of high-speed communication.

A diameter of the optical fiber 100 is preferably, but not limited to, 500 to 1000 μm. That is, the diameter of the optical fiber 100 may be less than 500 μm or greater than 1000 μm. An optical signal b1, which is first light incident on the first core portion 101, travels straight along the center axis C1 within the first core portion 101 of the GI structure, or meanders along the center axis C1 within the first core portion 101 while being reflected on a side surface of the first core portion 101. A cladding layer may be formed on an outer peripheral portion (not shown) of the first core portion 101, and the optical signal b1 remains inside the first core portion 101. The optical signal b2, which is second light incident on the second core portion 102, travels straight along the center axis C1 within the second core portion 102 of the SI structure, or travels while being reflected on and between side surfaces of the second core portion 102. Cladding layers (not shown) are formed on the outer and inner peripheral sides of the second core portion 102, and the optical signal b2 remains inside the second core portion 102. In this way, the two types of optical signals (i.e., the uplink optical signal and the downlink optical signal) can be spatially separated in the optical fiber 100. The material of the core portion and the cladding portion of the optical fiber 100 is preferably a member having high transparency such as plastic and low optical propagation loss, but the material is not limited to plastic. Any material having high transparency, low optical propagation loss, and controllable refractive index can also be employed as materials of the core portions and cladding portions of the optical fiber 100. The first core portion 101 and the second core portion 102 may be made of different materials.

Semiconductor light emitting elements are used for light sources of the optical signals. Thus, the entire system can be miniaturized and power consumption can be reduced. For example, as a light source of the optical signal b1, a semiconductor light emitting element capable of transmitting a high-speed signal of several Gbps or more can be used. As an example, a vertical cavity surface emitting laser (VCSEL: Vertical Cavity Surface Emitting LASER), which is a semiconductor light emitting element operable at a high frequency, can be used as the light source of the optical signal b1. In some cases, the configuration of the optical lens system can be formed relatively simply by using the VCSEL.

As a light source of the optical signal b2, it is possible to use a semiconductor light emitting element capable of transmitting a medium-speed signal of about several Mbps, which is slower than the the optical signal generated by the VCSEL. One example thereof is an LED (light emitting diode). That is, the LED can be used as a light source of the optical signal b2. By using these light sources described above, it is possible to prevent interference between the uplink optical signal and the downlink optical signal, and to prevent signal attenuation due to band limitation by propagating the optical signal through a core having core characteristics corresponding to respective transmission bands. It should be noted that the optical signal b1 transmitted in the second core portion 102 is hardly mixed into the first core portion 101.

Figure 2:
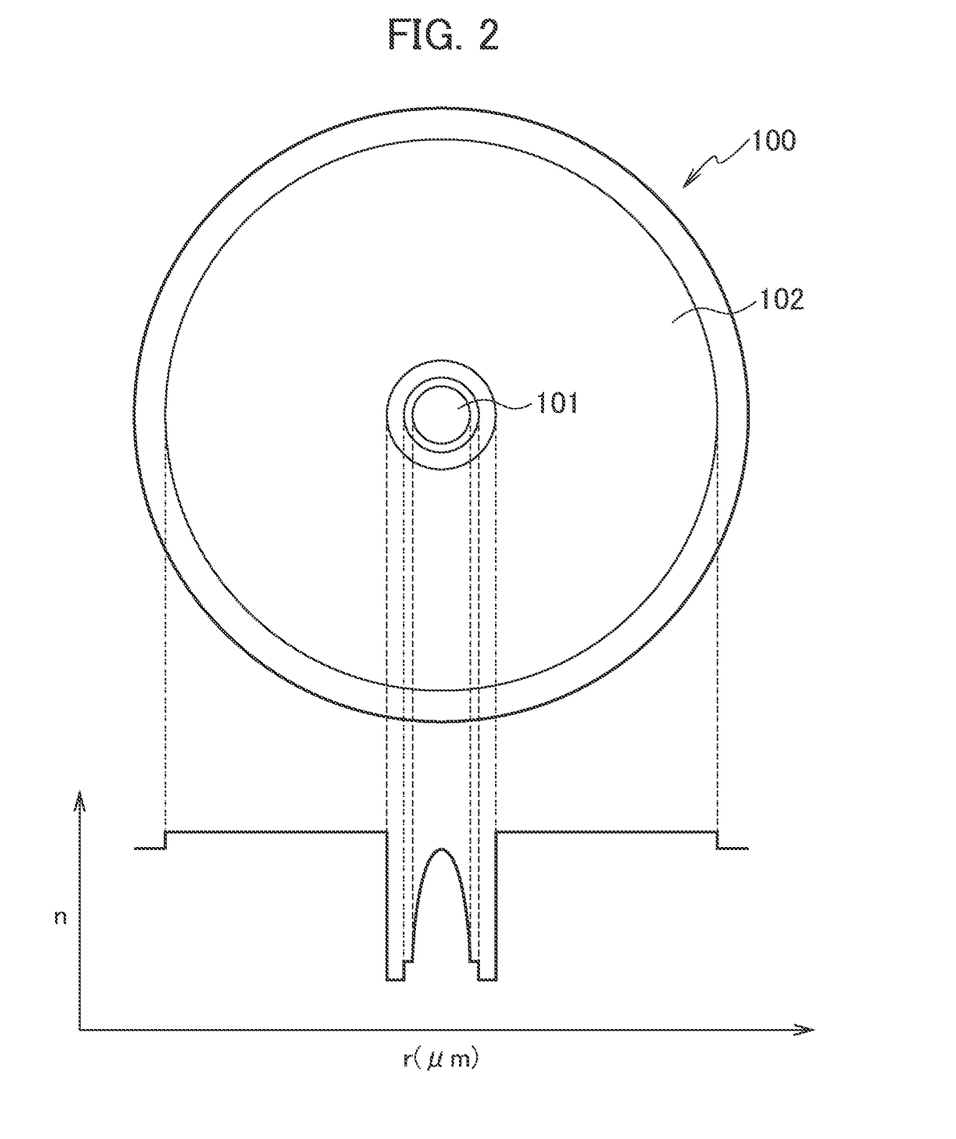
FIG. 2 is a schematic diagram illustrating an enlarged transverse cross-section of the optical fiber according to the present embodiment, and is a schematic diagram illustrating a distribution image of a refractive index in the transverse cross-section.

The upper part of FIG. 2 schematically illustrates a cross-section of the optical fiber 100 shown in FIG. 1. The lower part of FIG. 2 is a schematic diagram illustrating the refractive index distribution in the cross-section of the optical fiber 100 shown in FIG. 1. The relative relationships of the dimensions and refractive indices shown in the upper and lower portions of FIG. 2 may differ from those of the actual optical fiber.

The upper portion of FIG. 2 illustrates the first core portion 101 of the GI structure provided in the central region of the optical fiber 100 and the second core portion 102 of the SI structure provided on the outer peripheral side of the first core portion 101. The lower portion of FIG. 2 schematically illustrates a variation of the refractive index along the diameter of the optical fiber 100 in the upper portion of FIG. 2. Hereinafter, an overview of the variation of the refractive index will be described with reference to the lower part of FIG. 2. The details of the refractive index will be described later with reference to FIG. 5.

The second core portion 102 is a core portion forming the SI structure. The refractive index in the region of the second core portion 102 is substantially constant. The refractive index of the second core portion 102 is larger than the maximum value of the refractive index of the first core portion 101 whose refractive index varies. A cladding portion provided on the outer periphery of the SI structure is provided on the outer periphery of the second core portion 102. A cladding portion provided on the inner periphery of the SI structure is provided on the inner periphery of the second core portion 102. The refractive index of the cladding portion arranged on the outer periphery of the second core portion 102 is substantially constant and is larger than the maximum value of the refractive index of the first core portion 101. Further, the refractive index of the cladding portion arranged on the inner periphery of the second core portion 102 is substantially constant and smaller than the lowest value of the refractive index of the first core portion 101.

The first core portion 101 forms a GI structure, and the refractive index distribution has a curved surface symmetrical to the center axis of the first core portion 101. The region of the first core portion 101 may or may not include a cladding portion located on the outer periphery of the GI structure. The refractive index distribution of the core of the GI structure is a known technique and will not be described in detail herein. The material of the first core portion 101 and the second core portion 102 may be a polymer such as a perfluorinated polymer. However, the aforementioned materials are not limited to this polymer. The materials of the first core portion 101 and the second core portion 102 can be a material satisfying the characteristics of the transmission band of light propagating through the first core portion 101 and the second core portion 102.

(1.2) Overview of Optical Transmission Modules

Figure 3:
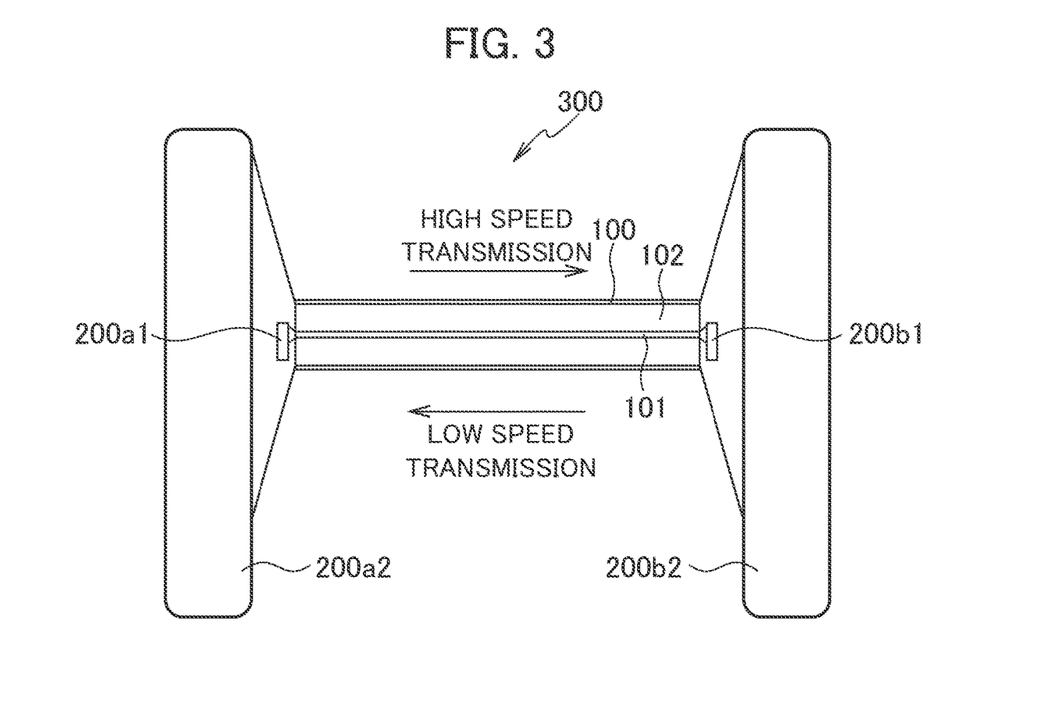
FIG. 3 is a schematic diagram illustrating an example of an overview of an optical transmission module according to the present embodiment.

FIG. 3 is a schematic diagram illustrating an optical transmission module 300 provided with FOTs (Fiber Optical Transceivers) at both ends of the optical fiber 100 of FIG. 1.

A first transmission FOT unit 200a1 is provided on the transmission side of the optical signal b1 to enable high-speed transmission by the optical signal b1 passing through the first core portion 101. A first reception FOT unit 200b1 is provided on the reception side of the optical signal b1 to enable high-speed transmission by the optical signal b1 passing through the first core portion 101. The first transmission FOT unit 200a1 includes a light emitting element and an optical element such as a lens. The first reception FOT unit 200b1 includes a light receiving element and an optical element such as a lens. Details of the first transmission FOT unit 200a1 and the first reception FOT unit 200b1 will be described later.

A second transmission FOT unit 200b2 is arranged on the transmission side of the optical signal b2 to enable medium speed or low speed transmission by the optical signal b2 passing through the second core portion 102. Further, the second reception FOT unit 200a2 is provided on the receiving side of the optical signal b2 to enable the medium speed or low speed transmission by the optical signal b2 passing through the second core portion 102. The second transmission FOT unit 200b2 includes a light emitting element and an optical element such as a lens. The second reception FOT unit 200a2 includes a light receiving element and an optical element such as a lens. Details of the second transmission FOT unit 200b2 and the second reception FOT unit 200a2 will be described later. FIG. 3 enlarges the size of the second reception FOT unit 200a2 in order to show a state where it receives the optical signal b2 exited at wide angles from the end face of the optical fiber 200. Similarly, FIG. 3 enlarges the size of the second transmission FOT unit 200b2 in order to show a state where the optical signal b2 from the light source is converged on the end surface of the optical fiber 200.

In the present embodiment, the first transmission FOT unit 200a1 and the second reception FOT unit 200a2 for enabling bidirectional communication by one optical fiber 100 may be collectively referred to as the first FOT unit 200a. The first reception FOT unit 200b1 and the second transmitting FOT unit 200b2 may be collectively referred to as the second FOT unit 200b. Therefore, the first FOT unit 200a and the second FOT unit 200b may be included in optical fiber connectors (not shown) at both ends of the optical fiber 100.

As described above, for example, a semiconductor light emitting element capable of transmitting a high-speed signal of several Gbps or more can be used as the first transmission FOT unit 200a1. As an example, a VCSEL is exemplified as the semiconductor light emitting element operable at a high frequency. As described above, for example, a semiconductor light emitting element capable of transmitting a medium-speed signal of about several Mbps, which is slower than the signal of the VCSEL, can be used as the second transmission FOT unit 200b2. As an example, an LED (light emitting diode) is exemplified as the semiconductor light emitting element capable of transmitting the medium speed signal. A light receiving semiconductor element such as a photodiode or a phototransistor can be used as each of light receiving elements. It is possible to constitute optical transmission modules each having an optimum cost by using light receiving elements each having a transmission band corresponding to the transmission speed of the optical signal b1 or the optical signal b2.

(2) Details of Optical Fiber and Optical Transmission Module

The details of the optical fiber 100 will be described with reference to FIG. 5. The details of the optical transmission module will be described with reference to FIG. 4.

(2.1) Details of Optical Fiber

Figure 5:
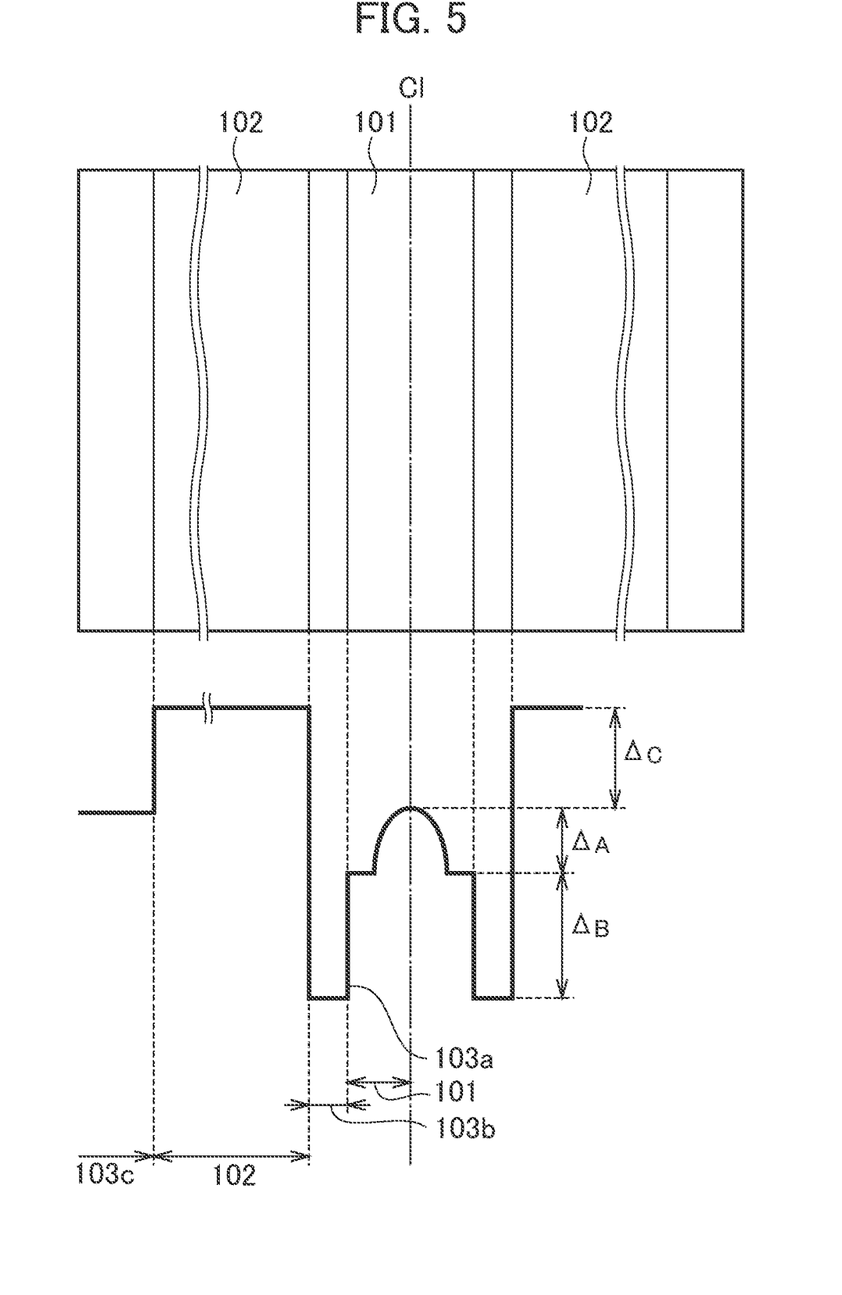
FIG. 5 is a schematic diagram illustrating an example of a refractive index distribution of an optical fiber according to the present embodiment.

FIG. 5 illustrates an example of the refractive index distribution of the optical fiber 100. As described above, the first core portion 101 has the GI structure. The second core portion 102 has the SI structure. That is, it is possible to transmit two kinds of signals with one optical fiber by providing an optical fiber having the GI structure in an optical fiber having the SI structure. Further, when a FOT capable of transmitting and receiving by separating wavelengths is used, the selection range of the wavelength of the optical signal can be expanded. In FIG. 5, the first core portion 101, the first cladding portion 103a, the second cladding portion 103b, the second core portion 102, and the third cladding portion 103c are formed around the center axis C1. However, for convenience of explanation, FIG. 5 illustrates only the radial portion of the center axis C1 of each of the aforementioned regions.

For example, an LED ($\lambda$=660 nm) can be used as a light source for the first core portion 101 having the GI structure in a transmission system having an asymmetric communication speed. Further, the VCSEL (single mode oscillation of $\lambda$=850 nm) is used as a light source for the second core portion 102 having the SI structure. For the first core portion 101 and the second core portion 102, a material having a high transmittance (For example, a transmittance of 90% or more) with respect to the wavelength of a light source to be used is selected and used. Alternatively, a light emitting element, which has a wavelength having a high transmittance (For example, a transmittance of 90% or more) in a material selected as a material for the first core portion 101 and the second core portion 102, may be selected and used. Examples of the first core portion 101 and the second core portion 102 include, but are not limited to, resin such as plastic or glass such as quartz glass. The materials of the first core portion 101 and the second core portion 102 may be different. A fluorinated polymer may be used for the first core portion 101 and the second core portion 102.

In the following description, the first core portion 101 uses a material having a transmittance of 90% or more for a wavelength $\lambda$ of 850 nm. The second core portion 102 uses a material having a transmittance of 90% or more for a wavelength $\lambda$ of 660 nm. When the numerical aperture (NA) of the optical fiber of the first core portion 101 with the GI structure is set to 0.2 or more, the fractional index difference $\Delta_A$ in the first core portion 101 must be set to 0.0111 or more. Here, the fractional index difference is expressed by $(n1-n2)/n1$ when the refractive index n1 and the refractive index n2 (<n1) are assumed. That is, in the first core portion 101 with the GI structure shown in FIG. 5, a value, which is obtained by dividing the difference between the refractive index of a portion with the highest refractive index and the refractive index of a portion with the lowest refractive index by the refractive index of the portion with the highest refractive index, is required to be set to about 0.0111 or more.

In addition, since quartz optical fibers are generally vulnerable to bending, there is a concern about the danger of fragments arising from cut and broken surfaces. Further, the optical fiber of the present embodiment requires a high-precision connection to the mating (corresponding) optical fiber. Therefore, the present embodiment assumes the use of a plastic optical fiber (POF). The POF is flexible and resistant to bending due to the flexibility of the resin, its material is inexpensive, and the connection accuracy of the optical fiber is laxer than that of the quartz optical fiber. In addition, by using the fluorinated polymer, it is possible to perform high-speed communication exceeding communication with the quartz optical fiber. However, it should be noted the use of optical fibers other than POF is not excluded.

Considering the above, the refractive index of the first core portion 101 is preferably set to about 1.350 to 1.342, and the radius of the first core portion 101 is preferably set to about 25 to 50 μm. The first cladding portion 103a having a thickness of 0 μm to 2.0 μm and having a refractive index equal to that of the outermost periphery of the first core portion 101 is preferably provided on the outer periphery of the first core portion 101. Hereinafter, a case in which a GI-POF structure is formed by the first core portion 101 with the GI structure and the first cladding portion 103a, is supposed and described.

As described above, the first cladding portion 103a having a thickness of 0 μm to 2.0 μm and having a refractive index equal to that of the outermost periphery of the first core portion 101 is preferably provided on the outer periphery of the first core portion 101. A second cladding portion 103b is provided on the outer periphery of the first cladding portion 103a such that the GI structure and the SI structure function with respect to the wavelengths of light passing through the first core portion 101 and the second core portion 102. The fractional index difference $\Delta_B$ between the second cladding portion 103b and the first cladding portion 103a is set to be a half or more of the fractional index difference $\Delta_A$ between the first core portion 101 and the first cladding portion 103a. The fractional index difference $\Delta_B$ between the second cladding portion 103b and the first cladding portion 103a is preferably set to 0.0055 or more, for example, set to 0.0060. That is, the fractional index difference between the second cladding portion 103b and the outermost peripheral portion of the first core portion 101 is preferably set to 0.0055 or more. The material of the first cladding portion 103a need not be changed according to the radius of the first core portion 101 and the material such as glass or resin.

In consideration of the eccentricity of the optical fiber 100, the thickness of the second cladding portion 103b is preferably set to about 2.0 μm to 6.5 μm. The thickness of the second cladding portion 103b need not be changed according to the radius of the first core portion 101 and the first cladding portion 103a and the material such as glass or resin.

The second core portion 102 and the third cladding portion 103c are formed on the outer periphery of the second cladding portion 103b, to form an optical fiber having the SI structure. The refractive index of the third cladding portion 103c is required to be larger than that of the first core portion 101. Further, it is necessary to determine the fractional index difference between the second core portion 102 and the third cladding portion 103c so that the numerical aperture NA obtained by combining the second core portion 102 and the third cladding portion 103c becomes 0.5 or more. Therefore, the fractional index difference $\Delta_C$ between the refractive index of the second core portion 102 and the third cladding portion 103c is preferably set to 0.0559 or more, for example, set to 0.1329. Accordingly, the refractive index of the second core portion 102 is preferably set to 1.557 or more, and the radius of the second core portion 102 is preferably set to about 245 μm to about 500 μm. Further, the refractive index of the third cladding portion 103c is preferably set to about 1.35. A protective material for protecting the inside of the optical fiber 100 may be provided on the outer periphery of the third cladding portion 103c.

The material used for the optical fiber 100 preferably does not change in properties thereof at a temperature from room temperature to 85° C. or 105° C. When the optical fiber 100 is bent, the light in the SI-POF structure does not pass into the GI structure. Therefore, light passing through the SI structure does not mix into the GI structure.

According to the optical fiber 100 having the above structure, in a communication system in which the optical communication speed is asymmetric, it is possible to appropriately transmit optical signals having the asymmetric optical communication speed by one optical fiber 100 without causing interference between the optical signals.

Further, according to the optical fiber 100 having the above structures, in the communication system in which the optical communication speed is asymmetric, it is possible to avoid forming an over-spec optical communication path as an optical communication path requiring an optical signal of medium/low speed or low speed. Therefore, the cost of the optical fiber and the communication system can be reduced.

Further, according to the optical fiber 100 having the above structures, WDM (Wavelength Division Multiplexing) communication can be appropriately used. That is, since the wavelength can be spatially separated by the optical fiber 100, it is not necessary to use a wavelength filter, and the cost can be reduced. In addition, it is also possible to expand the range of wavelengths to be selected.

Further, since the range of the wavelength to be selected can be expanded by the optical fiber 100 having the above structure, a wavelength having a low propagation loss can be selected. Therefore, the reliability of the communication system can be improved.

(2.2) Details of Optical Transmission Module

Figure 4:
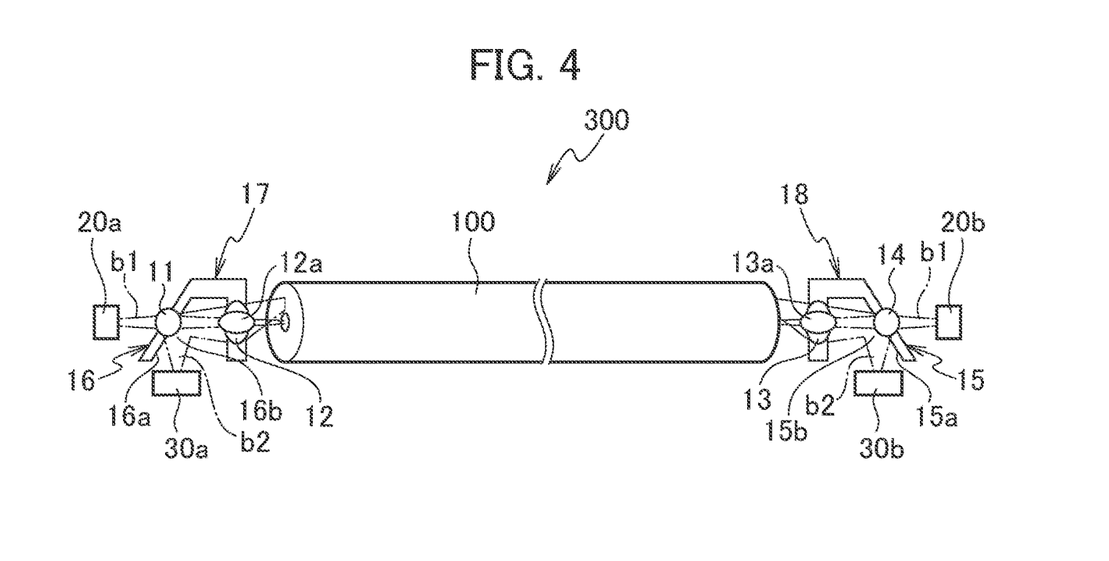
FIG. 4 is a schematic diagram illustrating an example of a configuration of an optical transmission module according to the present embodiment.

FIG. 4 is a schematic diagram illustrating an example of a configuration of the optical transmission module 300.

The optical signal b1 as first light is emitted from the first light emitting element 20a, travels straight or meanders in the first core portion 101 of the optical fiber 100 via the optical element, and enters the first light receiving element 20b. On the other hand, the optical signal b2 as second light is emitted from the second light emitting element 30b, travels in the second core portion 102 of the optical fiber 100 while being reflected through the optical element, and enters the second light receiving element 30a.

First, an optical path of the optical signal b1, which is emitted from the first light emitting element 20a and enters the first core portion 101 of the optical fiber 100, will be described (see the left side of optical fiber 100 in FIG. 3).

The first lens 11 is provided between the first light emitting element 20a and one end face of the optical fiber 100. The first lens 11 converges the optical signal b1 emitted from the first light emitting element 20a onto the end face of the optical fiber 100. In this case, the converged optical signal b1 passes through the second opening portion 12a provided at the center of the second lens 12 and enters the first core portion 101 of the optical fiber 100.

Next, an optical path of the optical signal b1, which exits from the first core portion 101 of the optical fiber 100 and enters the first light receiving element 20b, will be described (see the right side of optical fiber 100 in FIG. 3).

The optical signal b1 exited from the first core portion 101 passes through the third opening portion 13a and enters the fourth lens 14. The fourth lens 14 is provided between the other end face of the optical fiber 100 and the first light receiving element 20b. The fourth lens 14 converges the optical signal b1 exited from the first core portion 101 on a light receiving face of the first light receiving element 20b. The optical signal b1 incident on the light receiving surface of the first light receiving element 20b is converted into an electric signal. The third opening portion 13a is provided substantially at the center of the third lens 13 to pass the optical signal b1 exited from the first core portion 101.

Next, an optical path of the optical signal b2, which is emitted from the second light emitting element 30b and enters the second core portion 102 of the optical fiber 100, will be described (see the right side of optical fiber 100 in FIG. 3).

The optical signal b2 is emitted from the second light emitting element 30b toward the first reflection mirror 15. The first reflection mirror 15 reflects the optical signal b2 toward the third lens 13. The first reflection mirror 15 is formed in a flat plate shape, for example. The first reflection mirror 15 includes a first reflecting surface 15a configured to reflect light, and a fourth opening portion 15b. The fourth opening portion 15b is provided substantially at the center of the first reflection mirror 15. A fourth lens 14 is arranged in the fourth opening portion 15b. The first reflecting surface 15a of the first reflection mirror 15 faces the second light emitting element 30b at a predetermined angle. The optical signal b2 emitted from the second light emitting element 30b is reflected toward the third lens 13 by the first reflecting surface 15a. As described above, the first reflection mirror 15 makes the optical signal b1 exited from the first core portion 101 incident on the fourth lens 14 provided in the fourth opening portion 15b so that the optical signal b1 is converged on the light receiving surface of the first light receiving element 20b.

The third lens 13 converges light while changing the traveling direction of the optical signal b2. The third lens 13 is provided between the optical fiber 100 and the fourth lens 14, and converges the optical signal b2 reflected by the first reflection mirror 15 to the second core portion 102. Further, the third lens 13 passes the optical signal b1 exited from the first core portion 101 through the third opening portion 13a, thereby allowing the optical signal b1 to pass through the third lens 13 and enter the fourth lens 14. The incident angle and the incident position of the optical signal b2 incident on the second core portion 102 can be set at an arbitrary angle and position by appropriately designing parameters such as the curved surface and the refractive index of the third lens 13. That is, the incident angle and the incident position of the optical signal b2 on the second core portion 102 can be determined by the third lens 13 and the first reflection mirror 15.

Next, an optical path of the optical signal b2, which exits from the second core portion 102 of the optical fiber 100 and enters the second light receiving element 30a will be described (see the left side of optical fiber 100 in FIG. 3).

The optical signal b2 exits from the second core portion 102 of the optical fiber 100 and enters the second lens 12. The second lens 12 is provided between the first lens 11 and the optical fiber 100, and converges the optical signal b2 exited from the second core portion 102 to the second reflection mirror 16 while changing the traveling direction of the optical signal b2. The second reflection mirror 16 is a mirror configured to reflect light. The second reflection mirror 16 is formed in a flat plate shape, for example. The second reflection mirror 16 includes a second reflecting surface 16a reflecting light and a first opening portion 16b. The first opening portion 16b is provided substantially at the center of the second reflection mirror 16. A first lens 11 is arranged in the first opening portion 16b. The second reflecting surface 16a of the second reflection mirror 16 faces the second light receiving element 30a at a predetermined angle. The optical signal b2 is reflected by the second reflecting surface 16a and is converged on the light receiving surface of the second light receiving element 30a.

The first support part 17 supports the second reflection mirror 16 and the second lens 12. The second support part 18 supports the third lens 13 and the first reflection mirror 15.

According to the configuration described above, it is possible to configure the optical transmission module which transmit and receive the optical signal b1 passing through the first core portion 101 and transmit and receive the optical signal b2 passing through the second core portion 102. For example, it is possible to constitute a bidirectional optical transmission module in which the transmission direction of the optical signal b1 passing through the first core portion 101 is different from the transmission direction of the optical signal b2 passing through the second core portion 102.

(Modification 1)

In the embodiment described above, the VCSEL is used as the first light emitting element 20a to increase the signal transmission speed in the first core portion 101 to about 1 Gbps or more. However, the first light emitting element 20a is not limited to a VCSEL. For example, any laser having a frequency band in the GHz band may be used as the first light emitting element 20a. Further an LED is used as the second light emitting element 30b. However, the second light emitting element 30b is not limited to LEDs. For example, an arbitrary light emitting element having a frequency band in the MHz band may be used as the second light emitting element 30b.

(Modification 2)

In the embodiment described above, the first core portion 101 is a multi-mode optical fiber having the GI structure. However, the first core portion 101 is not limited to a multi-mode optical fiber having the GI structure. For example, the first core portion 101 may be a single-mode optical fiber. In this case, the second core portion 102 is preferably a multimode optical fiber having the SI structure. Even when the first core portion 101 is a single-mode optical fiber, the transmission speed of the signal in the first core portion 101 can be made higher than the transmission speed of the signal in the second core portion 102.

(Comparative Example)

Figure 6A:
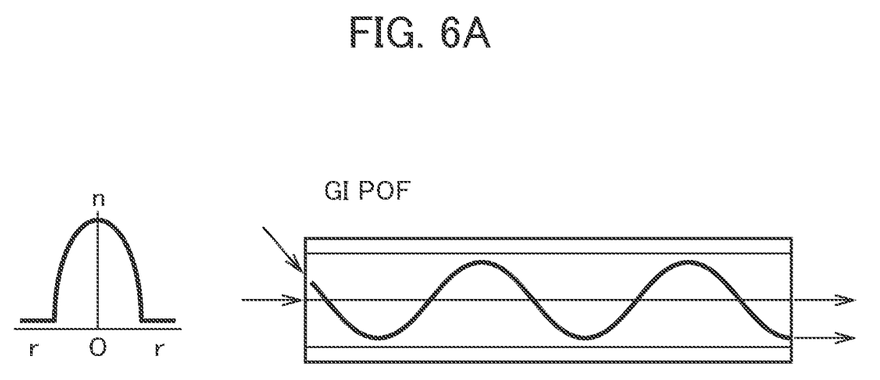
FIG. 6A is a schematic diagram illustrating an example of a GI-POF (Graded Index—Plastic Optical Fiber) according to a comparative example.
Figure 6B:
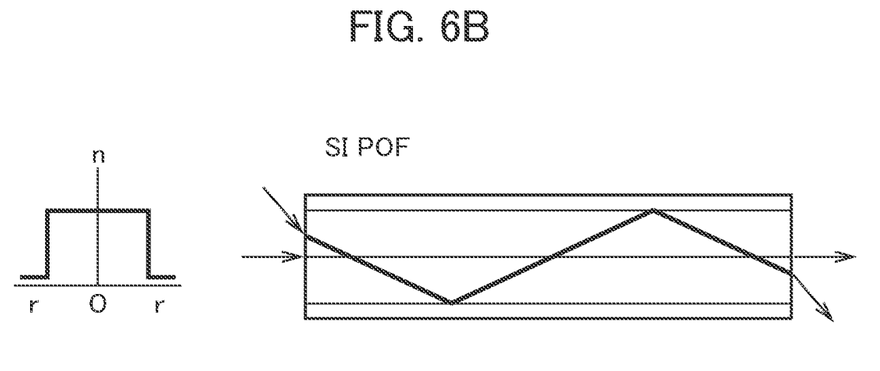
FIG. 6B is a schematic diagram illustrating an example of SI-POF (Step Index—Plastic Optical Fiber) according to the comparative example.
Figure 7:
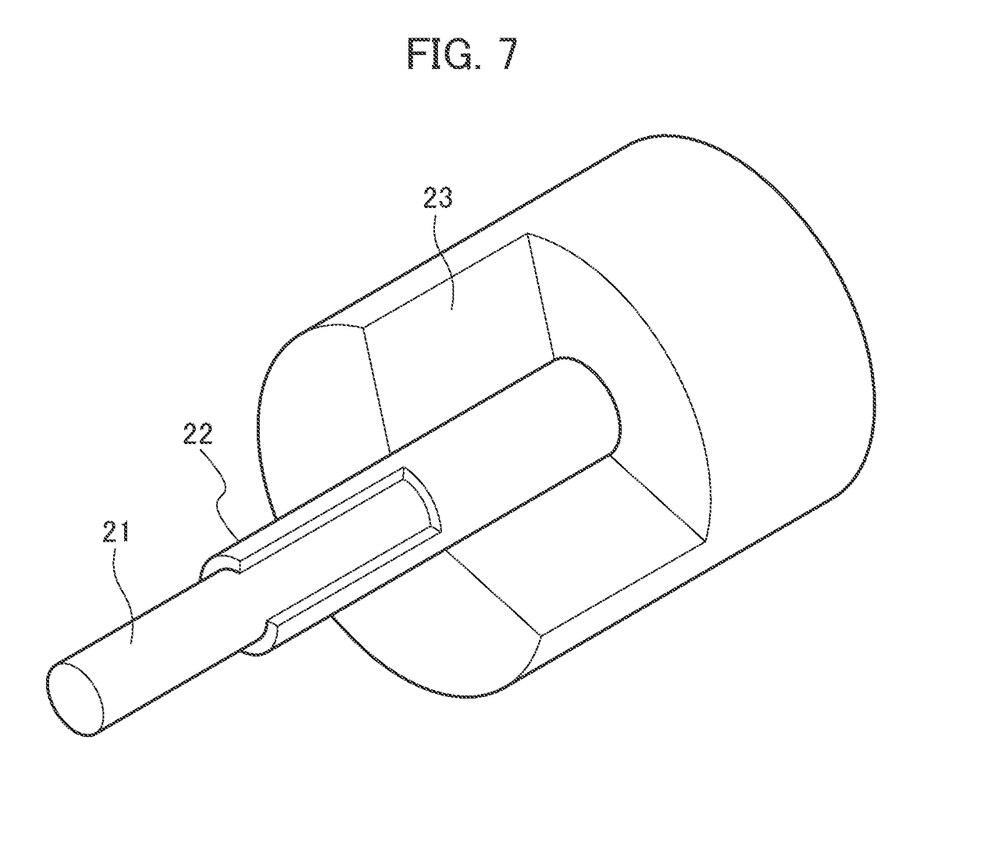
FIG. 7 is a perspective view illustrating an example of a configuration of an HPCF (Hard Plastic Cladding Silica Fiber) according to a comparative example.

FIG. 6A is a schematic diagram illustrating an example of a single optical fiber which is a GI-POF (Graded Index—Plastic Optical Fiber) according to a comparative example. FIG. 6B is a schematic diagram illustrating an example of a single optical fiber which is a SI-POF (Step Index—Plastic Optical Fiber) according to a comparative example. FIG. 7 is a schematic diagram illustrating an example of a single optical fiber which is a HPCF (Hard Plastic Cladding Silica Fiber) according to a comparative example.

A single optical fiber which is a GI-POF shown in FIG. 6A will be described. In the GI structure shown in FIG. 6A, the refractive index is largest at the center of the core of the optical fiber, and decreases non-linearly toward the outer peripheral side of the optical fiber. Light traveling through the center of the core having a large refractive index travels slower than light traveling through the periphery of the core having a small refractive index. Alternatively, light traveling through the periphery of the core having the small refractive index travels faster than light traveling through the center of the core having the large refractive index. Therefore, the arrival time difference between the optical modes can be reduced, and the transmission band of the GI-POF can be expanded as compared with the transmission band of the SI-POF shown in FIG. 6B. As a result, the GI-POF has a wider transmission band than the SI-POF and can realize a structure capable of performing high-speed communication. For example, the transmission speed of the optical signal transmitted in the GI-POF may be several Gbps or more.

As described above, in the case of the SI-POF, the arrival time difference between the light modes is larger than that of the GI-POF. Therefore, the arrival time of light at the end of the optical fiber are different depending on the modes. Therefore, when the widths of the propagating optical pulses are widened and the speed of the optical pulses becomes high, separation of adjacent two successive pulses may become difficult. Therefore, the transmission band of SI-POF is narrower than that of GI-POF. Accordingly, the SI-POF can be a structure capable of performing medium and low speed communication. For example, the transmission speed of the optical signal transmitted in the SI-POF may be achievable from several Mbps to several tens Mbps.

An example of one optical fiber which is HPCF shown in FIG. 7 will be described. The optical fiber shown in FIG. 7 includes: a core portion 21 formed of quartz glass, a cladding portion 22 formed of plastic resin having a low refractive index and high hardness, and a coating material 23 formed of a fluorine-based resin or the like that enhances strength of the optical fiber. The core portion 21 has a diameter larger than that of a core portion formed of glass. Therefore, high positioning accuracy is not required in coupling with a light source and connection between fibers, and thus its handling is easy. For example, the transmission speed of the optical signal transmitted in the HPCF may be several hundred Mbps.

The respective transmission bands of the GI-POF, SI-POF, and HPCF are briefly determined as described above. Therefore, a problem arises in a transmission system in which the transmission speeds of the uplink optical signal and the downlink optical signal are different from each other. For example, assuming a general asymmetric bidirectional communication in which the uplink optical signal is about several Mbps and the downlink optical signal is about several Gbps or more, it is difficult to properly construct a highly reliable transmission system using a one (i.e., single) optical fiber. In other words, in the SI-POF, the transmission band is insufficient and the downlink optical signal cannot be transmitted. The GI-POF or the HPCF can somewhat transmit the uplink optical signal and the downlink optical signal described above. However, two of these optical fiber are required to construct a highly reliable transmission system without causing interference between the uplink optical signal and the downlink optical signal. In this case, the FOTs are required at both ends of each of the two optical fibers, and this is expected to increase the complexity and cost of the transmission system.

On the other hand, according to the optical fiber and the optical transmission system of the present embodiment, it is possible to solve the above problem by one optical fiber and providing the FOTs capable of transmitting and receiving wavelengths separately at both ends of the one optical fiber, wherein the one optical fiber is formed by properly designing and arranging an optical fiber having the GI structure in an optical fiber having the SI structure.

Features of the optical fiber 100 and the optical transmission module 300 including the optical fiber 100 according to the present embodiment will be described below.

The optical fiber 100 according to the first aspect of the present disclosure preferably includes the first core portion 101 capable of transmitting first light, and the second core portion 102 formed on the outer periphery of the first core portion 101 having a structure different from that of the first core portion 101 and capable of transmitting second light different from the first light. The second core portion 102 is formed around the outer periphery of the first core portion 101, and the center of the second core portion 102 is preferably positioned within the region of the first core portion 101.

According to the above configuration, the core portions having different characteristics are properly arranged, and high-speed communication with appropriately reduced interference between the uplink optical signal and the downlink optical signal is possible.

The refractive index of the second core portion 102 of the optical fiber 100 according to the second aspect of the present disclosure is preferably larger than the refractive index of the first core portion 101.

According to the above configuration, since the core portions having different characteristics are appropriately arranged, and interference between the uplink optical signal and the downlink optical signal can be appropriately reduced between the core portions, high speed communication with high reliability can be achieved.

In the optical fiber 100 according to the third aspect of the present disclosure, it is preferable to form the second cladding portion 103b having the refractive index smaller than the refractive index on the outermost periphery of the first core portion 101 between the outermost periphery of the first core portion 101 and the innermost periphery of the second core portion 102.

According to the above configuration, since the core portions having different characteristics are properly arranged and the cladding portion having an appropriate refractive index is provided between the inner peripheral side core portion and the outer peripheral side core portion, interference between the uplink optical signal and the downlink optical signal can be appropriately reduced, and high speed communication with high reliability can be achieved.

On the outer periphery of the second core portion 102 of the optical fiber 100 according to the fourth aspect of the present disclosure, the third cladding portion 103c, which has the refractive index smaller than the refractive index of the second core portion 102 and larger than the maximum refractive index of the first core portion 101, is preferably formed.

According to the above configuration, since the core portions having different characteristics are properly arranged and the cladding portion having an appropriate refractive index is further provided on the outer periphery of the core portion on the outer periphery side (i.e., the outer peripheral side core portion), the optical signal can be appropriately reflected inside the core portion on the outer periphery side (i.e., the outer peripheral side core portion). Therefore, high speed communication with high reliability can be achieved.

Preferably, the first core portion 101 of the optical fiber 100 according to the fifth aspect of the present disclosure includes the core portion having the GI structure, and the second core portion 102 is a core portion having the SI structure.

According to the above configuration, since the core portion having the SI structure is provided on the outer periphery of the core portion having the GI structure, the possibility of mixing light passing through the core portion of the SI structure into the core portion of the GI structure can be reduced even when the optical fiber is bent. As a result, highly reliable optical communication can be achieved in the optical fiber.

The first cladding portion 103a having the following structure is preferably formed between the first core portion 101 and the second cladding portion 103b of the optical fiber 100 according to the sixth aspect of the present disclosure. The first cladding portion 103a preferably has a refractive index at the outermost periphery of the first core portion 101, and has a thickness from a value greater than 0 µm and equal to 2.0 µm or less.

According to the above configuration, the core portion of the GI structure can be appropriately arranged in the first core portion 101, and high-speed communication of several Gbps or more can be easily achieved in the first core portion 101.

The fractional index difference between the refractive index at the outermost periphery of the first core portion 101 of the optical fiber 100 and the refractive index of the second cladding portion 103b according to the seventh aspect of the present disclosure is preferably a half or more of the fractional index difference between the maximum refractive index and the minimum refractive index of the GI structure of the first core portion 101.

In order to consider that the first core portion 101 has the GI structure and the second core portion 102 has the SI structure, the second cladding portion, which has a fractional index difference of ½ or more of a fractional index difference between the maximum refractive index and the minimum refractive index of the GI structure of the first core portion 101, is required. Therefore, according to the above configuration, some conditions for regarding the first core portion 101 as having the GI structure and the second core portion 102 as having the SI structure can be satisfied.

The fractional index difference between the refractive index of the second core portion 102 and the maximum refractive index of the first core portion 101 of the optical fiber 100 according to the eighth aspect of the present disclosure is preferably 0.0559 or more.

According to the above configuration, in the plastic optical fiber having the second core portion 102 of the SI structure, the numerical aperture of the second core portion 102 can be set to about 0.5 or more by appropriately selecting the refractive index of the second core portion 102. For example, in the above configuration, by setting the refractive index of the second core portion 102 to about 1.557, the numerical aperture of the second core portion 102 can be set to about 0.5 or more.

The wavelength range of the first light propagating through the first core portion 101 of the optical fiber 100 according to the ninth aspect of the present disclosure and the wavelength range of the second light propagating through the second core portion 102 are preferably the wavelength range used in optical communication. Preferably, the wavelength of the second light propagating through the second core portion 102 is shorter than the wavelength of the first light propagating through the first core portion 101, and the first light is coherent light and the second light is incoherent light.

According to the above configuration, in a communication system in which the transmission speeds of the uplink optical signal and the downlink optical signal are different, bidirectional communication can be appropriately and inexpensively performed by one single optical fiber having the GI structure inside the SI structure. For example, since it is possible to appropriately select a laser light source suitable for a light source of high-speed light propagating through the first core portion and an LED light source suitable for a light source of low-medium speed optical communication propagating through the second core portion, a system corresponding to a difference in transmission speed can be inexpensively constructed. Further, as an example, if the wavelength of the laser light source is set to 850 nm and the wavelength of the LED light source is set to 660 nm, it is possible to construct a highly reliable system using an inexpensive commercial product.

The optical transmission module 300 according to the tenth aspect of the present disclosure preferably includes the optical fiber 100 of any one of the first to ninth aspects, and a first light emitting element 20a and a first light receiving element 20b of first light propagating through the first core portion 101 of the optical fiber 100. The optical transmission module 300 preferably includes a second light emitting element 30b and a second light receiving element 30a of second light propagating through the second core portion 102 of the optical fiber 100.

According to the above configuration, in a communication system in which the transmission speeds of the uplink optical signal and the downlink optical signal are different, bidirectional communication can be appropriately executed by one optical fiber having the GI structure inside the SI structure.

In any of the above configurations, by appropriately arranging different core portions and appropriately selecting the characteristics of the light transmitting the core portions depending on the characteristics of the core portions, it is possible to realize an optical fiber and an optical transmission module capable of appropriately setting the transmission speeds of an uplink optical signal and a downlink optical signal.

(Supplement of Embodiments)

The configuration diagram used in the description of the above-described embodiments illustrated with some blocks of functional units. The method of implementing each functional block is not particularly limited to the one used for explanation. For example, each functional block may be implemented using one device that is physically or logically coupled, or two or more devices that are physically or logically isolated may be directly or indirectly connected and implemented using these devices.

The embodiments, modifications/embodiments, processing procedures, sequences, flowcharts, etc. described herein may be reordered as long as there is no conflict. For example, the methods described in the present disclosure present elements of various steps using exemplary sequences and are not limited to the particular sequences presented.

Further, the information, parameters, and the like described in the present disclosure may be expressed using an absolute value, a relative value from a predetermined value, or other corresponding information.

The names used for the parameters described above are not in any way restrictive. Furthermore, formulae and the like using these parameters may differ from those explicitly disclosed in this disclosure. The various names are not in any way restrictive.

The terms "connected" or "coupled", or any variation thereof, means any connection or combination, directly or indirectly, between two or more elements. It may also include the presence of one or more intermediate elements between two elements that are "connected" or "coupled" to each other. The coupling or connection between elements may be physical, logical, or a combination thereof.

Any reference to elements using the designations "first", "second", "first", "second", etc., as used in this disclosure does not generally limit the quantity or sequence of those elements. These designations may be used in the present disclosure as a convenient way of distinguishing between two or more elements. Thus, references to the first and second elements do not imply that only two elements may be employed, or that in some way the first element must precede the second element.

The "portion" or "part" in the configuration of each of the above apparatuses may be replaced with "means", "device" or the like.

Where "include", "including" and variations thereof are used in this disclosure, these terms are intended to be inclusive, as is the term "comprising". Furthermore, the term "or" as used in this disclosure is not intended to be an exclusive-OR.

In the present disclosure, where articles are added by translation, for example "a", "an" and "the" in English, the present disclosure may include that the nouns following these articles are plural.

In the present disclosure, the term "A and B are different" may mean "A and B are different from each other". It should be noted that the term may mean "A and B are different from C, respectively. The term "coupled" may also be interpreted in the same way as "different".

Each aspect/embodiment described in the present disclosure may be used alone, in combination, or alternatively as implemented.

Although the embodiments have been described in detail with reference to the drawings, the present invention is not limited by the contents described in the above embodiments. In addition, the components described above include those which can be easily assumed by a person skilled in the art and are substantially the same. Furthermore, the above-described configurations can be suitably combined. In addition, various omissions, substitutions, or modifications of the configuration may be made without departing from the spirit of the present invention.

What is claimed is:

1. An optical fiber comprising:
a first core portion capable of transmitting first light;
a second core portion formed on an outer periphery of the first core portion in a structure different from that of the first core portion and capable of transmitting second light different from the first light; wherein
the second core portion is formed around the outer periphery of the first core portion,
a center of the second core portion is positioned in a region of the first core portion,
a refractive index of the second core portion is larger than a refractive index of the first core portion,
a third cladding portion is formed on the outer periphery of the second core portion, and
a refractive index of the third cladding portion is smaller than the refractive index of the second core portion and larger than the maximum refractive index of the first core portion.

2. The optical fiber according to claim 1, wherein
a second cladding portion is formed between the outermost periphery of the first core portion and the innermost periphery of the second core portion, and
a refractive index of the second cladding portion is smaller than a refractive index of an outermost periphery of the first core portion.

3. The optical fiber according to claim 2, wherein
a first cladding portion is formed between the first core portion and the second cladding portion, and
the first cladding portion has the refractive index on the outermost periphery of the first core portion and a thickness having a value greater than 0 μm and equal to 2.0 μm or less.

4. The optical fiber according to claim 2, wherein
a fractional index difference between a refractive index of the outermost periphery of the first core portion and a refractive index of the second cladding portion is a half or more of a fractional index difference between a maximum refractive index and a minimum refractive index of the GI structure of the first core portion.

5. The optical fiber according to claim 1, wherein
the first core portion includes a core portion of a GI (Graded Index Fiber) structure, and
the second core portion is a core portion of a SI (Step Index Fiber) structure.

6. The optical fiber according to claim 1, wherein
a fractional index difference between the refractive index of the second core portion and the maximum refractive index of the first core portion is 0.0559 or more.

7. The optical fiber according to claim 1, wherein
a wavelength range of the first light propagating through the first core portion and a wavelength range of the second light propagating through the second core portion are wavelength ranges used in optical communication,
a wavelength of the second light propagating through the second core portion is shorter than a wavelength of the first light propagating through the first core portion,
the first light is coherent light, and
the second light is non-coherent light.

8. A optical transmission module comprising:
an optical fiber according to claim 1;
a first light emitting element and a first light receiving element of first light propagating through the first core portion of the optical fiber; and
a second light emitting element and a second light receiving element of second light propagating through the second core portion of the optical fiber.

* * * * *